(12) United States Patent
Nishimura (10) Patent No.: US 10,554,319 B2
(45) Date of Patent: Feb. 4, 2020

(54) WIRELESS COMMUNICATIONS WITH TIME SYNCHRONIZATION PROCESSING

(71) Applicant: Oki Electric Industry Co., Ltd., Tokyo (JP)

(72) Inventor: Hiroshi Nishimura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 15/875,355

(22) Filed: Jan. 19, 2018

(65) Prior Publication Data

US 2018/0270005 A1    Sep. 20, 2018

(30) Foreign Application Priority Data

Mar. 16, 2017 (JP) .................. 2017-051787

(51) Int. Cl.
*H04J 3/06* (2006.01)
*H04W 56/00* (2009.01)
*H04L 12/70* (2013.01)

(52) U.S. Cl.
CPC .......... *H04J 3/0697* (2013.01); *H04J 3/0664* (2013.01); *H04W 56/004* (2013.01); *H04W 56/0015* (2013.01); *H04L 2012/5668* (2013.01)

(58) Field of Classification Search
None
See application file for complete search history.

(56) References Cited

U.S. PATENT DOCUMENTS

2010/0316043 A1* 12/2010 Doi ..................... H04L 27/0006
370/350
2014/0189104 A1* 7/2014 Dalton ................ H04L 43/0876
709/224

FOREIGN PATENT DOCUMENTS

JP        2015-128199 A    7/2015

\* cited by examiner

*Primary Examiner* — Anh Ngoc M Nguyen
(74) *Attorney, Agent, or Firm* — Rabin & Berdo, P.C.

(57) ABSTRACT

A wireless communications device includes: a wireless transmission and reception section configured to transmit and receive packets by wireless communication; a time management section configured to manage time at the device; and a time synchronization processing section configured to execute time synchronization processing of the time managed by the time management section, using a time acquisition source, the time synchronization processing section transmitting, via the wireless transmission and reception section, a time correction report packet specifying the time that has been executed by the time synchronization processing using the time acquisition source.

5 Claims, 6 Drawing Sheets

WIRELESS COMMUNICATIONS WITH TIME SYNCHRONIZATION PROCESSING

CROSS-REFERENCE TO RELATED APPLICATION

This application claims priority under 35 USC 119 from Japanese Patent Application No. 2017-051787, filed on Mar. 16, 2017, the disclosure of which is incorporated by reference herein.

BACKGROUND

Technical Field

The present disclosure relates to a wireless communications device, a non-transitory computer readable medium storing a program, and a method. Further, for example, the present disclosure relates to a wireless communications device, a non-transitory computer readable medium storing a program, and a method that are applicable to a wireless multi-hop network that implements time synchronization between wireless communications devices (nodes).

Related Art

Heretofore, the technology disclosed in Japanese Patent Application Laid-Open (JP-A) No. 2015-128199 has been available as a technology that restrains an increase in traffic caused by time synchronization between nodes in a wireless multi-hop network. JP-A No. 2015-128199 discloses a gateway device (below referred to as a gateway) that acquires accurate time from an external server, and a node that is not capable of direct communication with the gateway device, acquires time from a host side node that has a smaller number of hops to the gateway than that node (that device).

In a conventional wireless multi-hop network, because of errors in clock frequencies and the like at the respective nodes, the progress of time at each node is different. Therefore, even in a case in which time has been synchronized once, offsets arise between the node times as time passes. Accordingly, in a conventional wireless multi-hop network, in order to maintain the precision of time synchronization, time synchronization processing is executed that implements time synchronization on plural occasions and that includes processing (below referred to as clock correction) to correct the progress of time on the basis of time offsets at the synchronizations. In this conventional wireless multi-hop network, if intervals between the time synchronizations are small, this leads to an increase in traffic, but if the intervals between time synchronizations are large, it takes time to complete clock correction through the network. This is because each node that cannot communicate directly with the gateway and must wait for the completion of clock correction at host side nodes before implementing clock correction at that node.

SUMMARY

The present disclosure provides a wireless communications device, a non-transitory computer readable medium storing a program, and a method, that may execute time synchronization processing efficiently.

A first aspect of the present disclosure is a wireless communications device including: a wireless transmission and reception section configured to transmit and receive packets by wireless communication; a time management section configured to manage time at the device; and a time synchronization processing section configured to execute time synchronization processing of the time managed by the time management section, using a time acquisition source, the time synchronization processing section transmitting, via the wireless transmission and reception section, a time correction report packet specifying the time that has been executed by the time synchronization processing using the time acquisition source.

A second aspect of the present disclosure is a non-transitory computer readable medium storing a wireless communications program executed by a computer equipped in a wireless communication device to function as: a wireless transmission and reception section configured to transmit and receive packets by wireless communication; a time management section configured to manage time at the wireless communication device; and a time synchronization processing section configured to execute time synchronization processing of the time managed by the time management section, using a time acquisition source, the time synchronization processing section transmitting, via the wireless transmission and reception section, a time correction report packet specifying the time that has been executed by the time synchronization processing using the time acquisition source.

A third aspect of the present disclosure is a wireless communications method to be carried out by a wireless communications device including a wireless transmission and reception section, a time management section and a time synchronization processing section, the wireless communications method including: transmitting and receiving packets via wireless communication by the wireless transmission and reception section; managing time at the device by the time management section; and executing time synchronization processing of the time managed by the time management section using a time acquisition source by the time synchronization processing section, and transmitting, by the time synchronization processing section via the wireless transmission and reception section, a time correction report packet specifying the time that has been executed by the time synchronization processing using the time acquisition source.

According to the aspects described above, the present disclosure provides a wireless communications device, program and method that may execute time synchronization processing efficiently.

BRIEF DESCRIPTION OF THE DRAWINGS

Exemplary embodiments will be described in detail based on the following figures, wherein.

DETAILED DESCRIPTION

Herebelow, an exemplary embodiment of a wireless communications device, program and method according to the present disclosure is described in detail while referring to the drawings.

Figure 2:
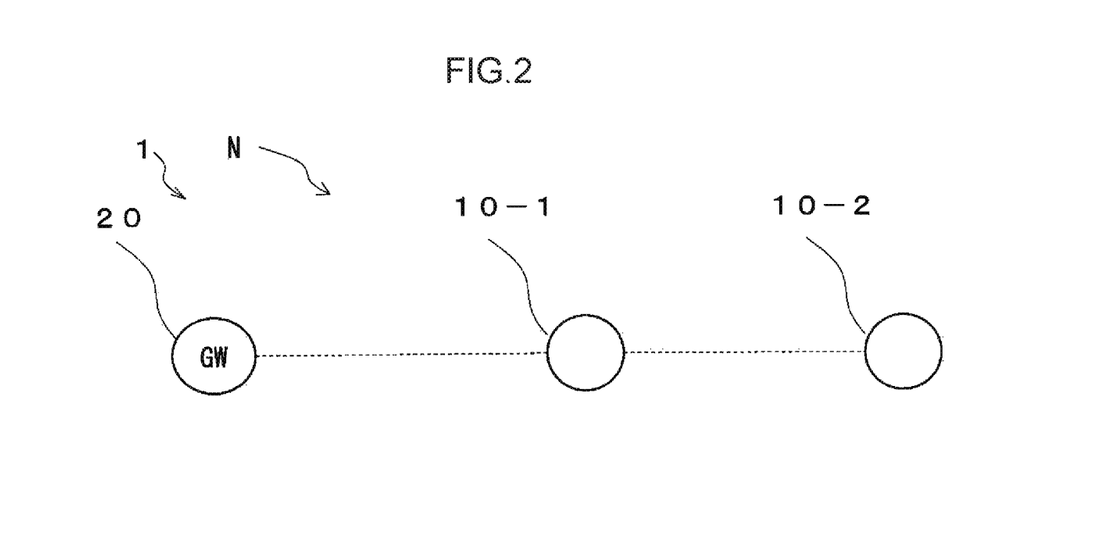
FIG. 2 is a descriptive diagram showing overall configuration of a wireless communications system (a wireless multi-hop network) according to the exemplary embodiment.

FIG. 2 is a block diagram showing an example of overall configuration of a wireless communications system 1 according to the exemplary embodiment.

Figure 1:
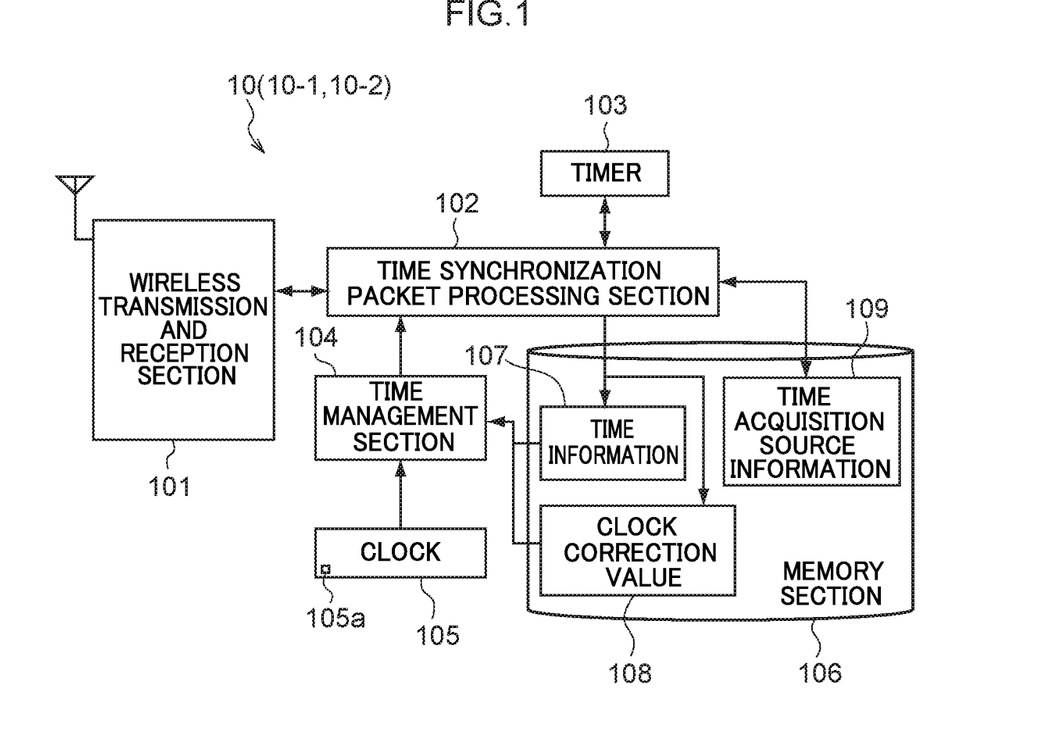
FIG. 1 is a block diagram showing functional configuration of a wireless communications device according to an exemplary embodiment.

As shown in FIG. 1, in the wireless communications system 1, a single gateway 20 and two wireless communications devices 10 (10-1 and 10-2) are arranged to configure a wireless multi-hop network N. Below, the wireless multi-hop network N is presented as a wireless multi-hop network built around the gateway 20. In the wireless multi-hop network N of the wireless communications system 1, numbers of the gateway 20 and the wireless communications device 10 are not limited. Below, wireless communications devices such as the wireless communications devices 10 (10-1 and 10-2), the gateway 20 and the like configuring the wireless multi-hop network N of the wireless communications system 1 are referred to in general as nodes. Furthermore, the descriptions below assume that an individual address (for example, a MAC address, a short address, an IP address or the like) is assigned to each node (gateway 20 or wireless communications device 10) in the wireless multi-hop network N.

The gateway 20 performs functions for overall management of the wireless multi-hop network N (the wireless communications system 1).

In FIG. 2, links between nodes between which direct wireless communications are possible are shown by dotted lines.

For example, in FIG. 2, the gateway 20 is shown as being capable of direct wireless communications with the wireless communications device 10-1, and the wireless communications device 10-2 is shown as being capable of direct wireless communications with the wireless communications device 10-1 but not capable of direct wireless communications with the gateway 20. Therefore, the wireless communications device 10-2 must communicate with the gateway 20 via the wireless communications device 10-1.

In the wireless multi-hop network N shown in FIG. 2 (the wireless communications system 1), the wireless communications device 10-1 is registered at the wireless communications device 10-2 as the parent node (the node at the host side in a case in which packets are to be transmitted to the gateway 20), and the gateway 20 is registered as the parent node at the wireless communications device 10-1. A process for setting parent nodes of the wireless communications devices 10 in the wireless multi-hop network N shown in FIG. 2 (the wireless communications system 1) is not limited. For example, in the wireless multi-hop network N (the wireless communications system 1), the parent nodes of the wireless communications devices 10 may be specified by flooding (the transmission of flooding packets) originating from the gateway 20, or the parent nodes may be statically specified for the wireless communications devices 10 beforehand.

In this exemplary embodiment, each wireless communications device 10 selects one node, from other nodes with which direct wireless communications are possible, to be a reference node for time synchronization processing (below referred to as "the time acquisition source"). In this exemplary embodiment, the parent node (the host side node when packets are to be transmitted to the gateway 20) is selected as the time acquisition source node for each wireless communications device 10.

Now, packets that are received and transmitted for time synchronization processing are described for each node (the gateway 20 or the wireless communications device 10-1 or 10-2) of the wireless communications system 1 (the wireless multi-hop network N).

One of the wireless communications devices 10 transmits a packet to request time synchronization (below referred to as a "time synchronization request packet") to the time acquisition source node (in this exemplary embodiment, the parent node). A data format of the time synchronization request packet is not limited but may be, for example, a packet in which predetermined data (codes) are embedded. A timing at which the wireless communications device 10 transmits the time synchronization request packet is described below.

The node receiving the time synchronization request packet (the gateway 20 or the wireless communications device 10-1 or 10-2) generates a packet in response to the time synchronization request packet (below referred to as a "time synchronization response packet") and transmits the time synchronization response packet to the transmission source of the time synchronization request packet. The time synchronization response packet specifies at least the reception time of the time synchronization request packet and the transmission time of the time synchronization response packet. In this exemplary embodiment, similarly to the wireless communications devices 10, in a case in which the gateway 20 receives a time synchronization request packet, the gateway 20 transmits a time synchronization response packet in response.

In a case in which the time synchronization response packet is received, the wireless communications device 10 receiving the time synchronization response packet executes time synchronization processing with the time acquisition source. After the time synchronization processing, the wireless communications device 10 transmits a packet reporting the time (below referred to as a "time correction report packet"). The time correction report packet specifies at least the transmission time of the time correction report packet.

Then, each wireless communications device 10 executes time synchronization processing on the basis of:

a transmission time at which the time synchronization request packet was transmitted to the time acquisition source (the parent node in this exemplary embodiment);

a reception time at which the time synchronization response packet was received from the time acquisition source;

information specified in the time synchronization response packet received from the time acquisition source;

a reception time at which a time correction report packet was received from the time acquisition source; and information specified in the time correction report packet received from the time acquisition source.

For example, the wireless communications device 10-2 executes time synchronization processing on the basis of:

the transmission time at which the wireless communications device 10-2 transmitted the time synchronization request packet to the wireless communications device 10-1, which is the time acquisition source (the parent node);

the reception time at which the wireless communications device 10-2 received the time synchronization response packet from the wireless communications device 10-1;

information specified in the time synchronization response packet received from the wireless communications device 10-1;

the reception time at which the wireless communications device 10-2 received a time correction report packet from the wireless communications device 10-1; and information specified in the time correction report packet received from the wireless communications device 10-1.

Details of the time synchronization processing within the wireless communications device 10 are described below. If no time correction report packet has been received from the time acquisition source, the wireless communications device 10 may execute the time synchronization processing without using information of a time correction report packet.

Now, an example of the internal configuration of each wireless communications device 10 is described using FIG. 1.

In this exemplary embodiment, all of the wireless communications devices 10 (10-1 and 10-2) are presented as configurations that can be described using FIG. 1.

The wireless communications device 10 as illustrated in FIG. 1 includes a wireless transmission and reception section 101, a time synchronization packet processing section 102, a timer 103, a time management section 104, a clock 105 and a memory section 106.

The memory section 106 is a section that stores various kinds of settings data and the like of the wireless communications device 10. In this exemplary embodiment, the memory section 106 stores time information 107, a clock correction value 108 and time acquisition source information 109. The time information 107 represents a time that has been corrected to align with the time acquisition source. The clock correction value 108 is for correcting an offset of the clock relative to the node that is the time acquisition source. The time acquisition source information 109 represents information relating to the time acquisition source. Details of the time information 107, clock correction value 108 and time acquisition source information 109 are described below.

The wireless transmission and reception section 101 is a wireless interface (packet transmission and reception section) that transmits and receives packets to and from other nodes by wireless signals. Of received packets, the wireless transmission and reception section 101 provides packets that relate to time synchronization to the time synchronization packet processing section 102. The wireless transmission and reception section 101 determines a parent node for packet transmission to the gateway 20 by a predetermined method. The time synchronization packet processing section 102 then sets an identifier (for example, address information or the like) of the parent node in the time acquisition source information 109 in the memory section 106.

The clock 105 generates clock pulses at a predetermined frequency. The clock 105 is equipped with a counter 105a that counts up (increments) in association with the clock pulses. That is, the clock 105 performs the function of determining the progress of time in the wireless communications device 10 (a timekeeping rate at which time is counted).

The time management section 104 calculates the current time being managed on the basis of a value in the counter 105a of the clock 105 (below referred to simply as "the counter value"), the time information 107 in the memory section 106, and the clock correction value 108 in the memory section 106.

For example, if a time set in the time information 107 in the memory section 106 is denoted as tc, the counter value of the counter 105a is denoted as A, and a factor for converting the counter 105a to a duration (below referred to as "the clock factor") is denoted as K, the time management section 104 may acquire the current time using the following expression (1). The time management section 104 executes processing to update the clock factor K using the clock correction value 108 in the memory section 106.

$$\text{Current time} = \text{time } tc + A \times K \quad (1)$$

The timer 103 is a section that manages various kinds of timing within the wireless communications device 10. The timer 103 keeps time on the basis of the time managed by the time management section 104.

The time synchronization packet processing section 102 executes transmission and reception processing of packets relating to time synchronization (time synchronization request packets, time synchronization response packets, time correction report packets and suchlike) and the time synchronization processing. In this exemplary embodiment, the time synchronization packet processing section 102 uses the timer 103 to manage a transmission timing of a time synchronization request packet (a time synchronization processing timing), a timeout duration from the transmission of the time synchronization request packet for reception of a time synchronization response packet, and the like.

The time synchronization packet processing section 102 sets a time to transmit the next time synchronization request packet to the timer 103 (the time synchronization processing timing). At a timing after the timer 103 times out, the time synchronization packet processing section 102 executes processing to transmit the time synchronization request packet via the wireless transmission and reception section 101.

In a case in which a time synchronization response packet is received, the time synchronization packet processing section 102 uses information specified in the received time synchronization response packet (the reception time of the time synchronization request packet and the transmission time of the time synchronization response packet) and executes processing (time correction processing) to update the time set in the time information 107 in the memory section 106 to align with the time acquisition source. In a case in which a time correction report packet is received, the time synchronization packet processing section 102 sets information specified in the time correction report packet and the reception time of the time correction report packet in the time acquisition source information 109 in the memory section 106. Hence, in a case in which a time synchronization response packet is received, the time synchronization packet processing section 102 uses the information specified in the received time synchronization response packet and the time acquisition source information 109 and executes processing (clock correction processing) to calculate a clock correction value kc and set (update) the clock correction value 108 (kc) in the memory section 106.

In a case in which the clock correction value 108 (kc) in the memory section 106 is updated, the time management section 104 updates the clock factor K in accordance with the clock correction value 108 (kc). For example, if the clock factor before an update is denoted as $K_1$ and the clock factor after an update based on the clock correction value kc is denoted as $K_2$, the time management section 104 may update the clock factor in accordance with the following expression (2).

$$K_2 = K \times kc \qquad (2)$$

After executing the time synchronization processing, the time synchronization packet processing section 102 specifies a transmission time (the current time of the time management section 104) in a time correction report packet and broadcasts the time correction report packet to the surroundings.

In the first execution of the time synchronization processing with the time acquisition source, the time synchronization packet processing section 102 implements only the setting of a reference time (the time information 107). In second and subsequent executions of the time synchronization processing, the time synchronization packet processing section 102 executes the time correction processing (processing to update the time information 107) and the clock correction processing (processing to update the clock correction value 108).

If the time synchronization packet processing section 102 executes the time synchronization processing a second or subsequent time in a state in which no time correction report packet has been received from the time acquisition source (for example, if the time acquisition source is the gateway 20), the time synchronization packet processing section 102 executes the clock correction processing without using information from a time correction report packet. Details of processing in this case are described below.

The wireless communications device 10 may be configured entirely by hardware (for example, a configuration employing a specific semiconductor chip) or some or all of the wireless communications device 10, apart from a communications interface such as the wireless transmission and reception section 101 and the like, may be configured by software. For example, the structural elements of the wireless communications device 10 shown in FIG. 1 apart from the wireless transmission and reception section 101 may be configured by installing a program (a wireless communications program according to the exemplary embodiment) in a computer. In this case, a clock source of a processor structuring this computer may be employed as the clock 105.

Now, an example of operations of the wireless communications system 1 is described.

Figure 3:
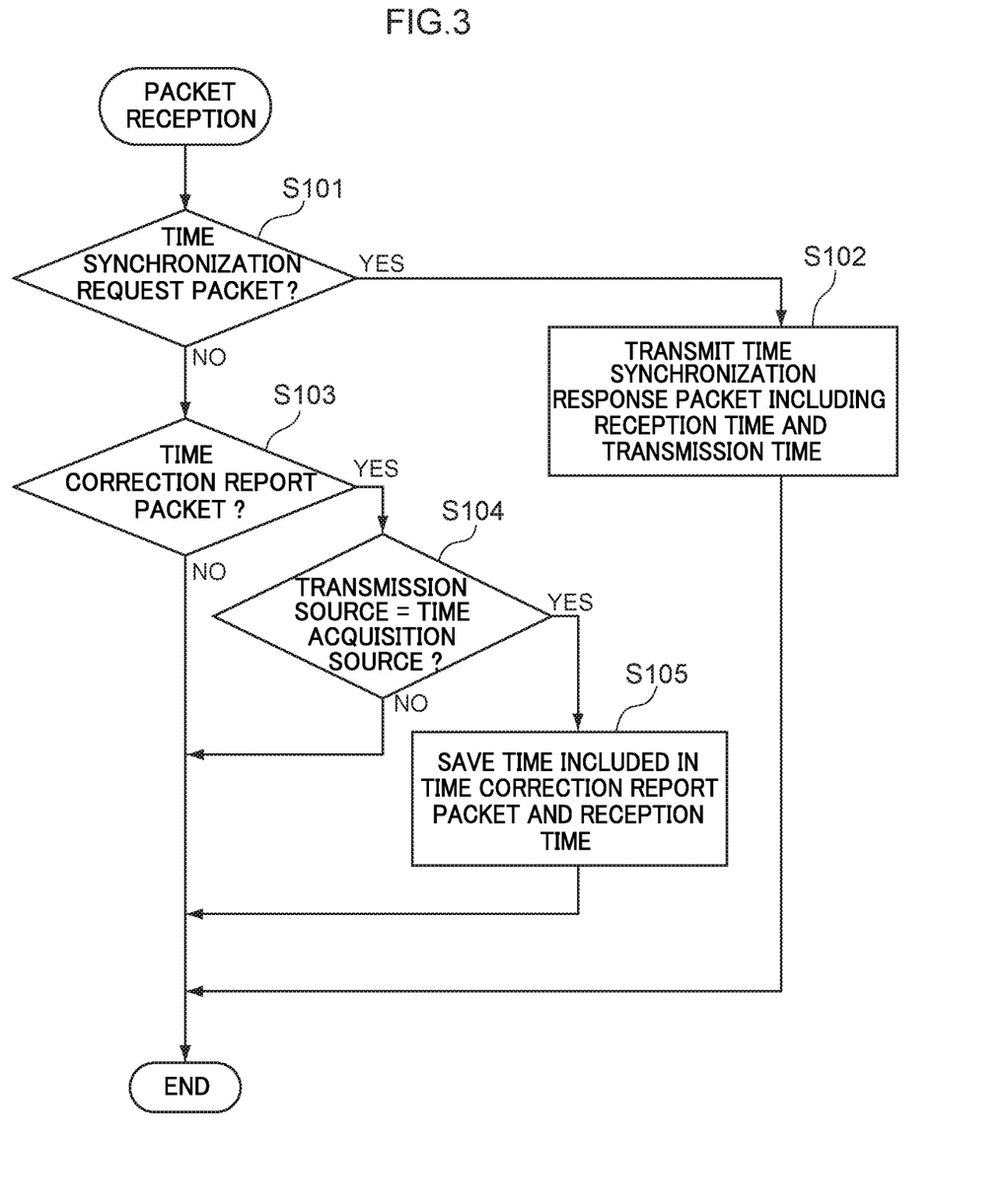
FIG. 3 is a flowchart showing operations in a case in which a packet is received by the wireless communications device according to the exemplary embodiment.

First, operations of the wireless communications device 10 are briefly described using the flowchart in FIG. 3.

FIG. 3 shows operations in a case in which the wireless communications device 10 (the wireless transmission and reception section 101) receives a packet.

In a case in which the wireless communications device 10 (the wireless transmission and reception section 101) receives a packet from another node, the wireless communications device 10 inspects the type of the packet. FIG. 3 is concerned with processing in a case in which the packet received by the wireless communications device 10 (the wireless transmission and reception section 101) is a time synchronization request packet or a time correction report packet.

The wireless communications device 10 (the wireless transmission and reception section 101) checks the contents of the received packet (S101 and S103). If the received packet is a time synchronization request packet, the wireless communications device 10 proceeds through step S102, which is described below. If the received packet is a time correction report packet, the wireless communications device 10 proceeds through step S104, which is described below.

If the received packet is a time synchronization request packet, the time synchronization packet processing section 102 generates a time synchronization response packet specifying the reception time of the time synchronization request packet and a transmission time (the current time) managed by the time management section 104, transmits the time synchronization response packet to the transmission source of the time synchronization request packet (S102), and ends the processing of the present flowchart.

Alternatively, if the received packet is a time correction report packet, the time synchronization packet processing section 102 checks (S104) whether or not the transmission source of the received time correction report packet is the time acquisition source node (the node whose identifier is set in the time acquisition source information 109). If the transmission source of the received time correction report packet is the time acquisition source node, the time synchronization packet processing section 102 proceeds through step S105, which is described below. If the transmission source is not the time acquisition source node, the time synchronization packet processing section 102 discards this time correction report packet and ends the processing of the present flowchart.

If the transmission source of the received time correction report packet is the time acquisition source node, the time synchronization packet processing section 102 saves (stores) the reception time of the time correction report packet and the information (transmission time) specified in the time correction report packet as the time acquisition source information 109 in the memory section 106 (S105), and ends the processing of the present flowchart.

Figure 4:
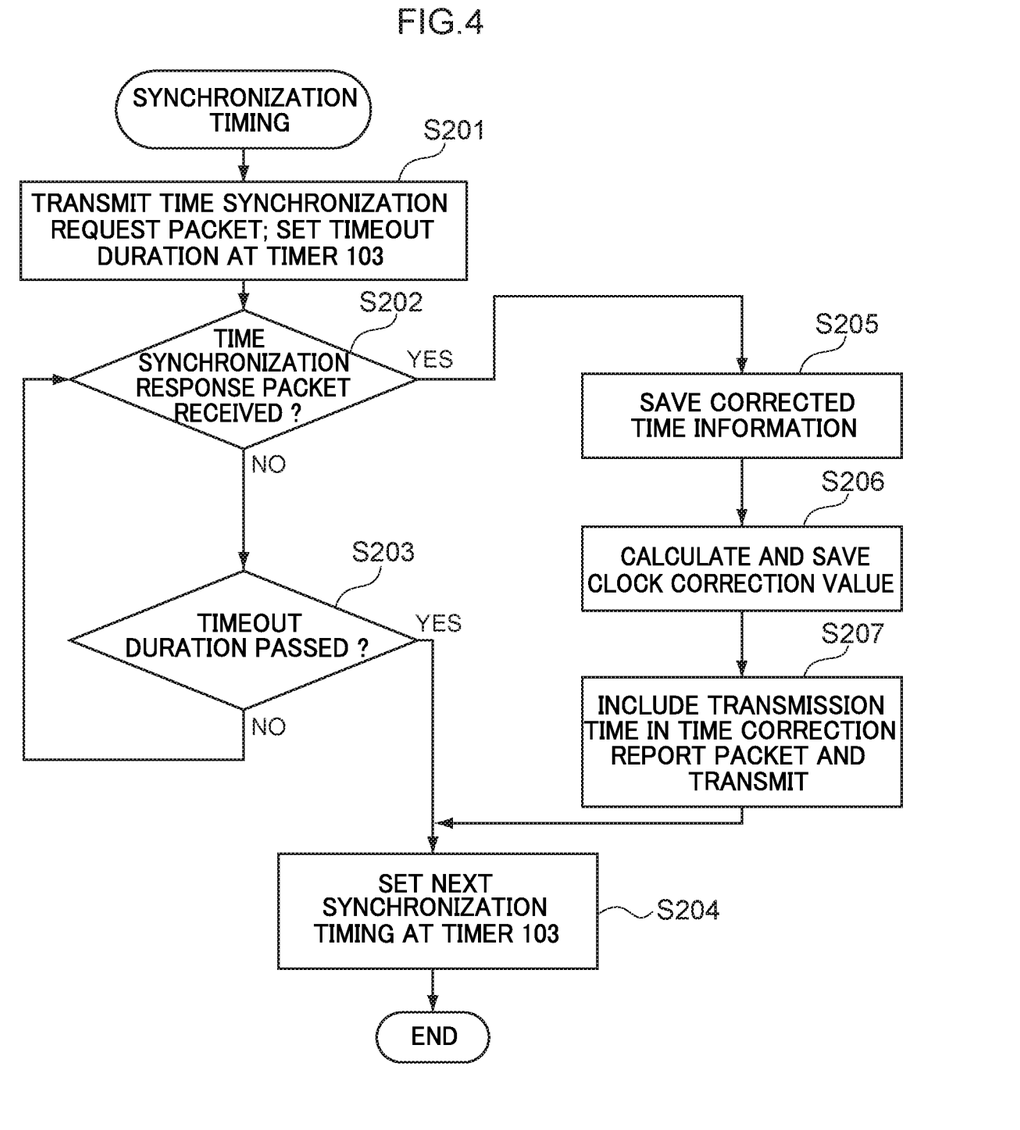
FIG. 4 is a flowchart showing operations in a case in which timing for time synchronization processing is reached in the wireless communications device according to the exemplary embodiment.

Now, operations at the wireless communications device 10 in a case in which a time synchronization processing timing is reached (a timing at which a time synchronization request packet is to be transmitted) are described using the flowchart in FIG. 4.

First, the time synchronization packet processing section 102 sets a timing for the next time synchronization processing at the timer 103. Subsequently, a timeout is generated at the timer 103 and the time synchronization packet processing section 102 determines that the time synchronization processing timing has been reached. For example, the time synchronization packet processing section 102 may set a pre-specified duration at the timer 103 (below referred to as "the time synchronization processing interval").

When the time synchronization processing timing is reached, the time synchronization packet processing section 102 generates and transmits a time synchronization request packet (a unicast packet) addressed to the time acquisition source (the time acquisition source set in the time acquisition source information 109). In addition, the time synchronization packet processing section 102 sets a timeout duration at the timer 103 to wait for the return of a time synchronization response packet (below referred to as "the response-waiting timeout duration") and starts timing by the timer 103 (S201). Separate arbitrary durations may be set for the time synchronization processing interval and the response-waiting timeout duration.

Thereafter, the time synchronization packet processing section 102 waits for the reception of a time synchronization response packet from the time acquisition source (S202 and S203), for a duration limited to the timeout of the timer 103 (the response-waiting timeout duration). If the time synchronization packet processing section 102 receives the time synchronization response packet within the response-waiting timeout duration, the time synchronization packet processing section 102 proceeds through step S205, which is described below. If the response-waiting timeout duration passes with no time synchronization response packet being received, the time synchronization packet processing section 102 proceeds through step S204, which is described below.

If the time synchronization response packet is received within the response-waiting timeout duration, the time synchronization packet processing section 102 executes processing (the time correction processing) to calculate a correction value (below referred to as "the time correction value D") corresponding to a difference between the time at the node of the time acquisition source and the time at the node of the time synchronization packet processing section 102 (the time managed by the time management section 104), using the reception time of the time synchronization response packet and the information specified in the time synchronization response packet, and to store a time corrected in accordance with the time correction value D in the time information 107 in the memory section 106 (S205). To be specific, the time synchronization packet processing section 102 adds the calculated time correction value D to the current time managed by the time management section 104, stores this time in the time information 107 in the memory section 106, and resets the counter 105a of the clock 105 (sets the counter value to zero). Thereafter, the time management section 104 manages the current time on the basis of the new time stored in the time information 107 in the memory section 106 and counter values of the counter 105a (counter values subsequent to the reset). As described above, in the first execution of the time synchronization processing, the time synchronization packet processing section 102 may store the transmission time specified in the received time synchronization response packet in the time information 107 in the memory section 106, reset the counter 105a of the clock 105 (set the counter value to zero), and start timekeeping at the time management section 104.

Hence, on the basis of the time correction value D calculated in step S205 and the information stored in the time acquisition source information 109, the time synchronization packet processing section 102 executes processing (the clock correction processing) to calculate a clock correction value kc corresponding to an offset of the clock (the progress of time) relative to the time acquisition source (below referred to as the timekeeping rate difference) and set the clock correction value kc in the clock correction value 108 in the memory section 106 (S206). As described above, in the first execution of the time synchronization processing, the time synchronization packet processing section 102 skips the processing of step S206 (the clock correction processing). Further, if no information associated with the reception of a time correction report packet has been set in the time acquisition source information 109 in the memory section 106, the time synchronization packet processing section 102 may calculate the clock correction value kc without using information of a time correction report packet (described in detail below).

Thereafter, the time synchronization packet processing section 102 specifies the current time subsequent to the time synchronization processing (the time managed by the time management section 104 after the processing of steps S205 and S206) as the transmission time in a time correction report packet, and broadcasts the time correction report packet to surrounding nodes (S207).

In a case in which the time synchronization packet processing section 102 proceeds to step S204, the time synchronization packet processing section 102 sets a timing for the next time synchronization processing (for example, the time synchronization processing interval) at the timer 103 (S204), and ends the processing of the present flowchart.

Now, an example of the time synchronization processing, in a case in which the nodes of the wireless communications system 1 (the gateway 20 and the wireless communications devices 10-1 and 10-2) operate in accordance with the flowcharts of FIG. 3 and FIG. 4 described above, is described using FIG. 5 and FIG. 6.

Figure 5:
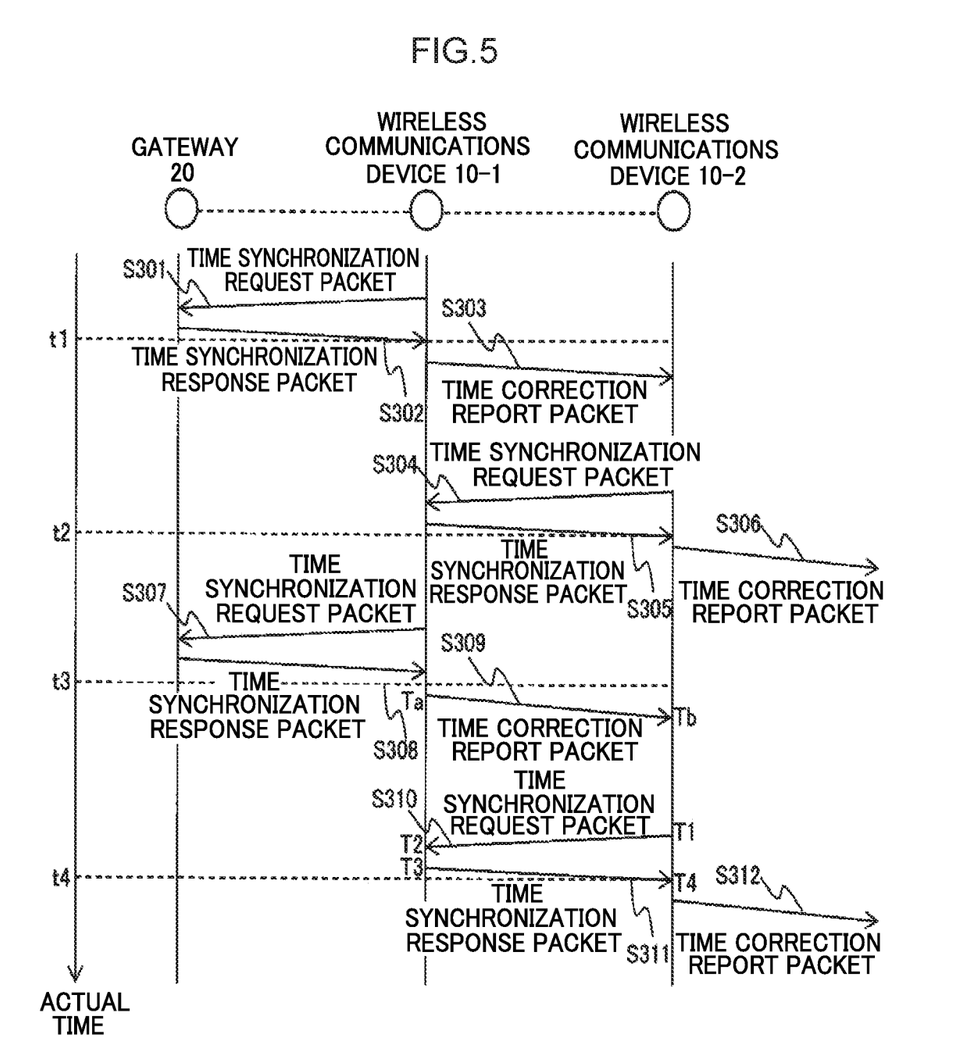
FIG. 5 is a sequencing diagram showing an example of the time synchronization processing of the wireless communications system according to the exemplary embodiment.
Figure 6:
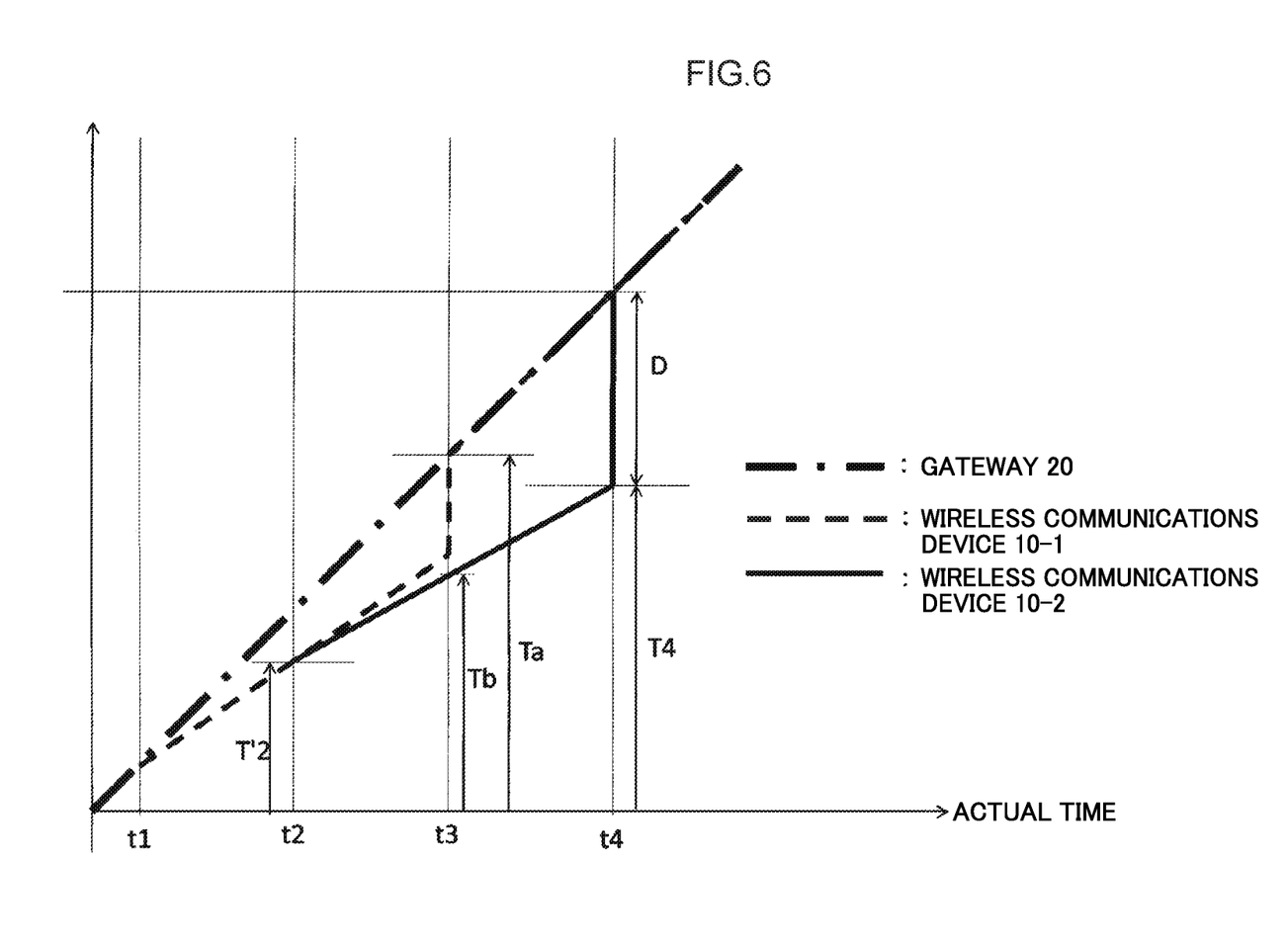
FIG. 6 is a descriptive diagram showing an example of timings at which the time synchronization processing is executed at the wireless communications system according to the exemplary embodiment.

FIG. 5 shows a sequence in a case in which the time synchronization processing is executed at the nodes (the gateway 20 and the wireless communications devices 10-1 and 10-2). FIG. 6 is a descriptive diagram depicting, in graph form, changes over time in the sequence in FIG. 5 of the times managed at the nodes.

In FIG. 5 and FIG. 6, t1 to t4 represent actual times, Ta, T2 and T3 represent internal times of the wireless communications device 10-1, and Tb, T1 and T4 represent internal times of the wireless communications device 10-2.

In the sequence diagram of FIG. 5, first, when a time synchronization processing timing is reached at the wireless communications device 10-1, a time synchronization request packet is transmitted from the wireless communications device 10-1 to the gateway 20 (S301). A time synchronization response packet is transmitted in response from the gateway 20 to the wireless communications device 10-1 (S302). On the basis of the time synchronization response packet that is received, the wireless communications device 10-1 executes the time synchronization processing for the first time (only setting the time). The wireless communications device 10-1 transmits a time correction report packet (S303). In FIG. 5, the time at which the wireless communications device 10-1 executes the time synchronization processing on the basis of the time synchronization response packet received in step S302 is represented as time t1.

Subsequently in the sequence diagram of FIG. 5, when a time synchronization processing timing is reached at the wireless communications device 10-2, a time synchronization request packet is transmitted from the wireless communications device 10-2 to the wireless communications device 10-1 (S304). In FIG. 5, the time at which the wireless communications device 10-2 executes the time synchronization processing on the basis of the time synchronization response packet received in step S304 is represented as time t2. A time synchronization response packet is transmitted in response from the wireless communications device 10-1 to the wireless communications device 10-2 (S305). On the basis of the time synchronization response packet that is received, the wireless communications device 10-2 executes the time synchronization processing for the first time (only setting the time). The wireless communications device 10-2 transmits a time correction report packet (S306).

Subsequently in the sequence diagram of FIG. 5, when a time synchronization processing timing is reached at the wireless communications device 10-1, a time synchronization request packet is transmitted from the wireless communications device 10-1 to the gateway 20 (S307), and a time synchronization response packet is transmitted in response from the gateway 20 to the wireless communications device 10-1 (S308). On the basis of the time synchronization response packet that is received, the wireless communications device 10-1 executes the time synchronization processing for the second time (time correction and clock correction), and the wireless communications device 10-1 transmits a time correction report packet (S309). In FIG. 5, the time at which the wireless communications device 10-1 executes the time synchronization processing on the basis of the time synchronization response packet received in step S307 is represented as time t3. The time correction report packet transmitted from the wireless communications device 10-1 is received by the wireless communications device 10-2. The information in the time correction report packet and the reception time of the time correction report packet are stored by the wireless communications device 10-2 (stored in the time acquisition source information 109).

Subsequently in the sequence diagram of FIG. 5, when a time synchronization processing timing is reached at the wireless communications device 10-2, a time synchronization request packet is transmitted from the wireless communications device 10-2 to the wireless communications device 10-1 (S310), and a time synchronization response packet is transmitted in response from the wireless communications device 10-1 to the wireless communications device 10-2 (S311). On the basis of the time synchronization response packet received by the wireless communications device 10-2, the wireless communications device 10-2 executes time synchronization processing for the second time (time correction and clock correction), and the wireless communications device 10-2 transmits a time correction report packet (S312). In FIG. 5, the time at which the wireless communications device 10-2 executes the time synchronization processing on the basis of the time synchronization response packet received in step S311 is represented as time t4.

In FIG. 5, Ta represents the transmission time that the wireless communications device 10-1 specifies in the time correction report packet transmitted in step S309. Further in FIG. 5, Tb represents the reception time at which the wireless communications device 10-2 receives the time correction report packet in step S309. T1 represents the transmission time at which the wireless communications device 10-2 transmits the time synchronization request packet in step S310. T2 represents the reception time at which the wireless communications device 10-1 receives the time synchronization request packet in step S310. T3 represents the transmission time that the wireless communications device 10-1 specifies in the time synchronization response packet transmitted in step S310. T4 represents the reception time at which the wireless communications device 10-2 receives the time synchronization response packet in step S311.

Now, relationships of the sequence and times depicted in FIG. 5 are described using the graphs in FIG. 6.

In FIG. 6, the horizontal axis represents actual time and the vertical axis represents internal times of the respective nodes (the gateway 20 and the wireless communications devices 10-1 and 10-2). Differences between the gradients of the graphs (curves) of the nodes are differences in the progress of time caused by clock offsets (timekeeping rate differences).

In FIG. 6, the time in the gateway 20 is represented by the single-dot chain line, the time in the wireless communications device 10-1 is represented by the broken line, and the time in the wireless communications device 10-2 is represented by the solid line.

In the example of FIG. 6, the gateway 20 acquires time from outside the wireless communications system 1 (for example, an external time server that is not shown in the drawings) or the like and the progress of time in the gateway 20 is accurate. Accordingly, in FIG. 6, the time in the gateway 20 (the single-dot chain line in FIG. 6) is equal to the actual time. The wireless communications device 10-1 can communicate directly with the gateway 20 and uses the gateway 20 as the time acquisition source. The wireless communications device 10-2 cannot communicate directly with the gateway 20 and uses the wireless communications device 10-1 as the time acquisition source. The wireless communications device 10-1 and the wireless communications device 10-2 execute time synchronization processing at respectively separate timings.

At time t1, the wireless communications device 10-1 executes the time synchronization processing with the gateway 20 for the first time (only setting the time) and sets the time managed by the time management section 104. Thus, the time managed in the wireless communications device 10-1 (the broken line in FIG. 6) is aligned with the time in the gateway 20. Thereafter, because the wireless communications device 10-1 has a clock offset (error) relative to the gateway 20, as time passes, a time offset arises between the wireless communications device 10-1 and the gateway 20. At time t3, the wireless communications device 10-1 executes the time synchronization processing with the gateway 20 for the second time (time correction and clock correction). Thus, a clock correction value 108 (kc) may be acquired to represent the difference in the progress of time relative to the gateway 20. The wireless communications device 10-2 executes the time synchronization processing at times t2 and t4. However, the time in the wireless communications device 10-1 is corrected at time t3, between times t2 and t4.

Accordingly, using the following expression (3) and expression (4), (the time synchronization packet processing section 102 of) the wireless communications device 10-2 may calculate a ratio of gradients relative to the wireless communications device 10-1 between time t3 and time t4 (from time t3 to time t4) to be used as a clock correction value kc.

$$\text{Time correction value } D=\{(T2+T3)-(T1+T4)\}/2 \quad (3)$$

$$\text{Clock correction value } kc=(T4+D-Ta)/(T4-Tb) \quad (4)$$

Thereafter, at each time synchronization processing timing of the wireless communications device 10-2, calculations similar to the above expression (3) and expression (4) are performed. Thus, the time correction value D and clock correction value kc may be computed, and time correction and clock correction may be implemented.

Similarly, at the wireless communications device 10-1, at time t3 and each subsequent time synchronization processing timing, the time correction value D and the clock correction value kc may be computed and time synchronization processing (time correction and clock correction) with the gateway 20 executed. In the example described above, because the wireless communications device 10-1 does not receive time correction report packets from the gateway 20 that is the time acquisition source, the clock correction value kc cannot be calculated using the above expression (4) as it is. As described above, when the time synchronization processing is executed a second or subsequent time in a state in which the time synchronization packet processing section 102 of a node has not received a time correction report packet from the time acquisition source (for example, when the time acquisition source is the gateway 20), the clock correction processing is executed without using information from a time correction report packet. For example, the wireless communications device 10-1 may set Ta and Tb in the above expression (4) to T'2, which is a time subsequent to the preceding time synchronization, to calculate the clock correction value kc. As described above, at time t3 and subsequent time synchronization processing timings of the wireless communications device 10-1, the time correction value D and clock correction value kc may be calculated using the above expression (3) and expression (4) (although with Ta and Tb being set to T'2) and the time synchronization processing (time correction and clock correction) may be executed.

According to this exemplary embodiment, the following function may be provided.

In the wireless communications system 1 according to this exemplary embodiment, when one of the wireless communications devices 10 has executed the time synchronization processing with a time acquisition source, the wireless communications device 10 transmits a time correction report packet reporting the corrected time to surrounding nodes. Thus, time synchronization processing at that node (calculation of a time correction value D and a clock correction value) may be executed without being affected by time synchronization processing timings at the node that is the time acquisition source. For example, the clock correction value at the wireless communications device 10 may be calculated even if the time at the node that is the time acquisition source has been corrected between two executions of time synchronization.

An example of implementing clock correction at the wireless communications device 10-2 without using a time correction report packet, in the processing of the sequence of FIG. 5 described above, is described using FIG. 7.

Figure 7:
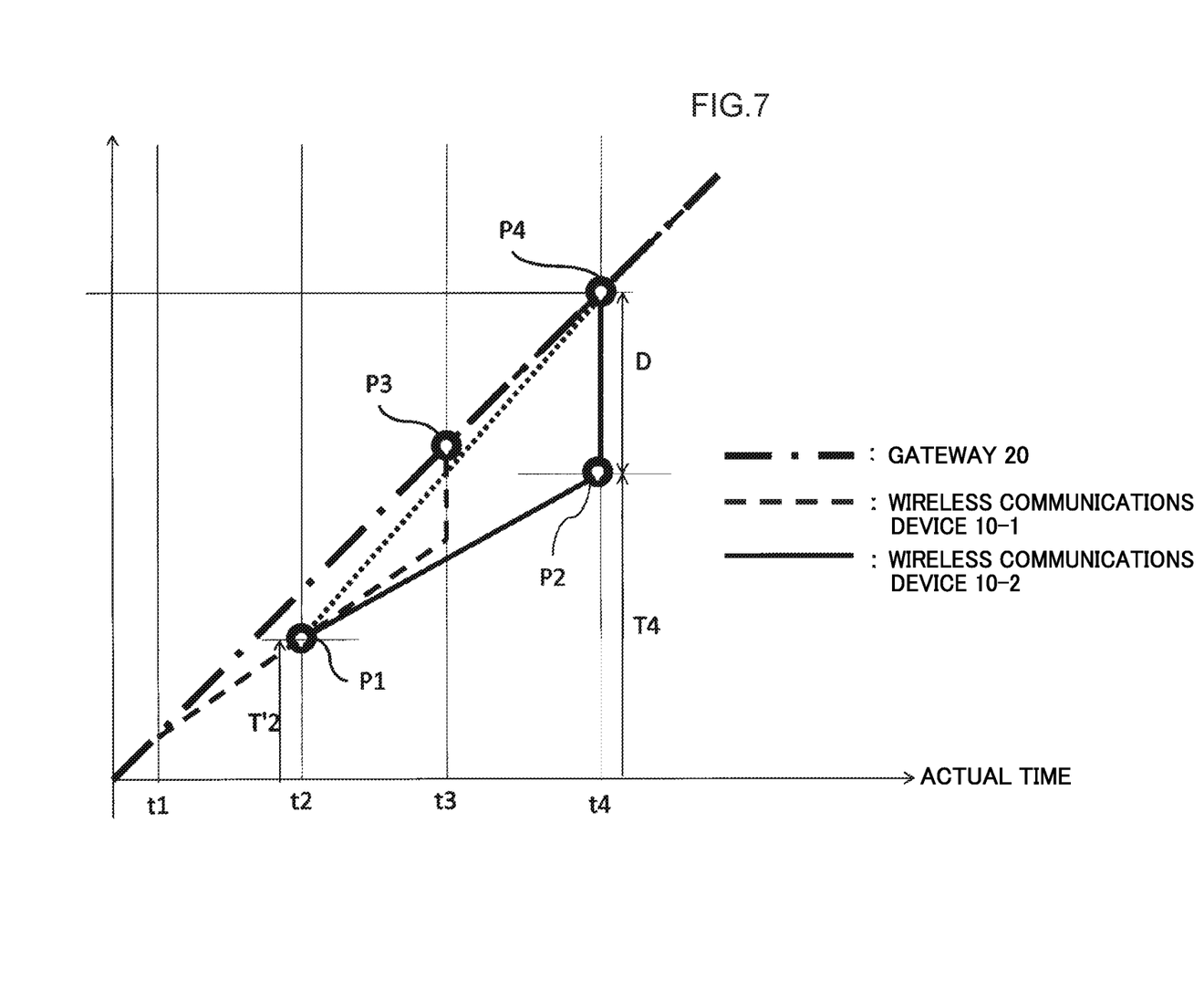
FIG. 7 is a descriptive diagram showing an example of timings in a case in which a time correction report packet is not used at the wireless communications system according to the exemplary embodiment.

In FIG. 7, graphs of the same types as in FIG. 6 are plotted.

If clock correction is implemented at the wireless communications device 10-2 without the use of a time correction report packet, only a clock correction in which Ta and Tb in the aforementioned expression (4) are set to zero (that is, kc=(T4+D−T'2)/(T4−T'2)) can be implemented. That is, if clock correction is implemented at the wireless communications device 10-2 without using a time correction report packet, only the gradient of the line joining points P1 and P4 in FIG. 7 is known at the wireless communications device 10-2 (because the wireless communications device 10-1 executes the time synchronization processing at time t3). For the wireless communications device 10-2 to obtain an accurate clock correction value kc (to obtain a clock correction value kc that discounts the effect of the time synchronization processing executed by the wireless communications device 10-1 at time t3), the wireless communications device 10-2 must obtain a difference between the progress of time at the wireless communications device 10-2 (the gradient of the line joining points P1 and P2 in FIG. 7) and the progress of time at the gateway 20 (the gradient of the line joining points P3 and P4 in FIG. 7). Therefore, the wireless communications device 10-2 implements clock correction as in expression (4) using a time correction report packet (i.e., calculates the clock correction value kc using Ta and Tb). Thus, an accurate clock correction value may be acquired regardless of time synchronization processing timings at the wireless communications device 10-1 that is the time acquisition source. That is, at each wireless communications device 10 in this exemplary embodiment, offsets of time relative to the gateway 20 may be thoroughly suppressed even if intervals between the time synchronization processing are long. Thus, effective time synchronization processing may be implemented.

In the wireless communications system 1 as described above, each time one of the wireless communications devices 10 executes the time synchronization processing, the wireless communications device 10 transmits a time correction report packet to the surroundings. Therefore, accurate clock correction values may be acquired by the wireless communications devices 10 regardless of the time synchronization processing timings of the wireless communications devices 10. In the example described above, in order to simplify descriptions, the wireless communications system 1 (the wireless multi-hop network N) is presented as the gateway 20 and the wireless communications devices 10-1 and 10-2. However, even if more of the wireless communications devices 10 are added, accurate clock correction values may be acquired by the wireless communications devices 10 by the execution of similar processing to the wireless communications device 10-1 and wireless communications device 10-2.

The present disclosure is not limited to the exemplary embodiment described above; variant embodiments such as that illustrated below may be mentioned.

In the exemplary embodiment described above, the wireless communications device 10-1 and wireless communications device 10-2 implement time synchronizations in the state in which the gateway 20 is provided with accurate time. However, for example, the gateway 20 may implement time synchronizations at predetermined intervals with an external time acquisition source that is not shown in the drawings. In this case, when the gateway 20 synchronizes time with the external time acquisition source (when the gateway 20 executes the time synchronization processing), the gateway 20 transmits a time correction report packet in the same manner as the wireless communications devices 10. Thus, the wireless communications device 10-1 may implement clock correction (clock correction in which the clock correction value kc is calculated using expression (4) as it is) on the basis of time correction report packets in the same manner as the other wireless communications devices 10. Similarly to the wireless communications devices 10, functional configurations of the gateway 20 in this case may be represented by a block diagram similar to FIG. 1 described above. That is, in the exemplary embodiment described above, the gateway 20 too may employ the same configuration as the wireless communication device of the present disclosure.

What is claimed is:
1. A wireless communications device comprising:
 a processor; and
 a non-transitory storage medium containing program instructions stored thereon, execution of which by the processor causes the wireless communications device to provide functions of:
  a wireless transmission and reception section configured to transmit and receive packets by wireless communication;
  a time management section configured to manage time at the device; and
  a time synchronization processing section configured to execute time synchronization processing of the time managed by the time management section, using a time acquisition source, the time synchronization processing section
   receiving a time correction report packet from the time acquisition source via the wireless transmission and reception section;

transmitting a time synchronization request packet requesting time synchronization to the time acquisition source via the wireless transmission and reception section;

receiving a time synchronization response packet from the time acquisition source via the wireless transmission and reception section, the time synchronization response packet being a packet in response to the time synchronization request packet transmitted by the device, and the time synchronization response packet specifying a reception time of the time synchronization request packet at the time acquisition source and a transmission time of the time synchronization response packet from the time acquisition source;

upon receiving the time synchronization response packet from the time acquisition source, executing the time synchronization processing using information of the time synchronization response packet and information of the time correction report packet received from the time acquisition source, calculating a time difference between a time managed by the time acquisition source and the time managed by the time management section on the basis of a transmission time of the time synchronization request packet to the time acquisition source, information of the time synchronization response packet received from the time acquisition source, and a reception time of the time synchronization response packet from the time acquisition source;

implementing a correction to align the time managed by the time management section with the time acquisition source by using the calculated time difference; and transmitting, via the wireless transmission and reception section, the time correction report packet specifying the time that has been executed by the time synchronization processing section using the time acquisition source.

2. The wireless communications device according to claim 1, wherein the time synchronization processing section:

calculates a timekeeping rate difference between timekeeping at the time acquisition source and at the time management section, using the calculated time difference, information of the time correction report packet received from the time acquisition source, and a reception time of the time correction report packet from the time acquisition source; and implements a correction to align a timekeeping rate at which the time management section keeps time with the time acquisition source, on the basis of the calculated timekeeping rate difference.

3. The wireless communications device according to claim 1, wherein, in a case in which the time synchronization processing section receives a time synchronization request packet requesting time synchronization with the device from a time synchronization request source via the wireless transmission and reception section, the time synchronization processing section:

generates a time synchronization response packet, the time synchronization response packet being generated in response to the time synchronization request packet received from the time synchronization request source, and the time synchronization response packet specifying a reception time of the time synchronization request packet from the time synchronization request source and a transmission time of the time synchronization response packet; and transmits the time synchronization response packet to the time synchronization request source via the wireless transmission and reception section.

4. A non-transitory computer readable medium storing a wireless communications program executed by a computer equipped in a wireless communication device to function as:

a wireless transmission and reception section configured to transmit and receive packets by wireless communication;

a time management section configured to manage time at the wireless communication device; and a time synchronization processing section configured to execute time synchronization processing of the time managed by the time management section, using a time acquisition source, the time synchronization processing section receiving a time correction report packet from the time acquisition source via the wireless transmission and reception section;

transmitting a time synchronization request packet requesting time synchronization to the time acquisition source via the wireless transmission and reception section;

receiving a time synchronization response packet from the time acquisition source via the wireless transmission and reception section, the time synchronization response packet being a packet in response to the time synchronization request packet transmitted by the device, and the time synchronization response packet specifying a reception time of the time synchronization request packet at the time acquisition source and a transmission time of the time synchronization response packet from the time acquisition source;

upon receiving the time synchronization response packet from the time acquisition source, executing the time synchronization processing using information of the time synchronization response packet and information of the time correction report packet received from the time acquisition source;

calculating a time difference between a time managed by the time acquisition source and the time managed by the time management section on the basis of a transmission time of the time synchronization request packet to the time acquisition source, information of the time synchronization response packet received from the time acquisition source, and a reception time of the time synchronization response packet from the time acquisition source;

implementing a correction to align the time managed by the time management section with the time acquisition source by using the calculated time difference; and transmitting, via the wireless transmission and reception section, the time correction report packet specifying the time that has been executed by the time synchronization processing section using the time acquisition source.

5. A wireless communications method to be carried out by a wireless communications device including a wireless transmission and reception section, a time management section and a time synchronization processing section, the wireless communications method comprising:

transmitting and receiving packets via wireless communication by the wireless transmission and reception section;
managing time at the device by the time management section; and
executing time synchronization processing of the time managed by the time management section using a time acquisition source by the time synchronization processing section, including:
    receiving a time correction report packet from the time acquisition source via the wireless transmission and reception section,
    transmitting a time synchronization request packet requesting time synchronization to the time acquisition source via the wireless transmission and reception section,
    receiving a time synchronization response packet from the time acquisition source via the wireless transmission and reception section, the time synchronization response packet being a packet in response to the time synchronization request packet transmitted by the device, and the time synchronization response packet specifying a reception time of the time synchronization request packet at the time acquisition source and a transmission time of the time synchronization response packet from the time acquisition source,
    upon receiving the time synchronization response packet from the time acquisition source, executing the time synchronization processing using information of the time synchronization response packet and information of the time correction report packet received from the time acquisition source,
    calculating a time difference between a time managed by the time acquisition source and the time managed by the time management section on the basis of a transmission time of the time synchronization request packet to the time acquisition source, information of the time synchronization response packet received from the time acquisition source, and a reception time of the time synchronization response packet from the time acquisition source, and
    implementing a correction to align the time managed by the time management section with the time acquisition source by using the calculated time difference, and
    transmitting, by the time synchronization processing section via the wireless transmission and reception section, the time correction report packet specifying the time that has been executed by the time synchronization processing section using the time acquisition source.

* * * * *